(12) United States Patent
Benanti et al.

(10) Patent No.: US 10,876,506 B2
(45) Date of Patent: Dec. 29, 2020

(54) DAMPER FOR A FLUID LINE, IN PARTICULAR A FUEL LINE FOR AN INTERNAL COMBUSTION ENGINE

(71) Applicant: HUTCHINSON S.R.L., Rivoli (IT)

(72) Inventors: Stefano Benanti, Turin (IT); Nicola Moretti, Gassino (IT); Florian Morice, Turin (IT); Luc Milanini, Bloomfield Hills, MI (US); Oliver Tanneau, Saint Ouen (FR); Victor Pillon, Aucaleuc (FR); Yann Kerros, Plerin (FR)

(73) Assignee: HUTCHINSON S.R.L., Rivoli (IT)

( * ) Notice: Subject to any disclaimer, the term of this patent is extended or adjusted under 35 U.S.C. 154(b) by 41 days.

(21) Appl. No.: 16/345,601

(22) PCT Filed: Oct. 23, 2017

(86) PCT No.: PCT/IB2017/056561
§ 371 (c)(1),
(2) Date: Apr. 26, 2019

(87) PCT Pub. No.: WO2018/078504
PCT Pub. Date: May 3, 2018

(65) Prior Publication Data
US 2019/0271285 A1    Sep. 5, 2019

(30) Foreign Application Priority Data

Oct. 26, 2016   (IT) ........................ 102016000108035

(51) Int. Cl.
*F16J 3/02*      (2006.01)
*F02M 37/00*    (2006.01)
*F16L 55/053*   (2006.01)

(52) U.S. Cl.
CPC ............ *F02M 37/0041* (2013.01); *F16J 3/02* (2013.01); *F16L 55/053* (2013.01); *F02M 2200/315* (2013.01)

(58) Field of Classification Search
CPC . F16L 55/04; F16L 55/053; F15B 1/12; F15B 2201/205; F15B 2201/3151
(Continued)

(56) References Cited

U.S. PATENT DOCUMENTS 2,371,632 A * 3/1945 Lippincott ............... F15B 1/125
138/30
3,292,428 A    12/1966 Motl
(Continued)

FOREIGN PATENT DOCUMENTS

DE         195 28 737 A1   11/1996
DE   10 2013 220807 A1   11/2014
(Continued)

OTHER PUBLICATIONS

International Search Report and Written Opinion from International Application No. PCT/IB2017/056561, dated Dec. 21, 2017.
(Continued)

*Primary Examiner* — Patrick F Brinson
(74) *Attorney, Agent, or Firm* — Merchant & Gould P.C.

(57) ABSTRACT

A damper for a fluid line, in particular a fuel line for an internal combustion engine, includes a housing having an inlet and an outlet for a fluid. A membrane is located in the housing and intended to be in contact with fluid flowing from the inlet to the outlet. A damping chamber is defined by the housing and the membrane. A fluid chamber is separated from the damping chamber by the membrane, in fluidic communication with the inlet and the outlet. A peripheral edge of the membrane includes an enlarged and/or thickened
(Continued)

portion that is inserted into a recess of the housing, for constraining the membrane to the housing.

15 Claims, 2 Drawing Sheets

(58) Field of Classification Search
USPC .................................................. 138/26, 30
See application file for complete search history.

(56) References Cited

U.S. PATENT DOCUMENTS

| | | | | |
|---|---|---|---|---|
| 3,474,830 | A * | 10/1969 | Hertell | F15B 1/24 |
| | | | | 138/30 |
| 3,948,288 | A * | 4/1976 | Mayer | F15B 1/18 |
| | | | | 138/30 |
| 4,163,461 | A * | 8/1979 | Jacobellis | F16L 55/053 |
| | | | | 138/30 |
| 4,729,360 | A | 3/1988 | Fehrenbach et al. | |
| 5,062,455 | A * | 11/1991 | Schurter | F15B 1/125 |
| | | | | 138/30 |
| 5,590,631 | A | 1/1997 | Tuckey | |
| 5,727,529 | A | 3/1998 | Tuckey | |
| 6,129,236 | A * | 10/2000 | Osokin | F15B 1/14 |
| | | | | 220/723 |
| 6,295,918 | B1 * | 10/2001 | Simmons | F04B 43/0054 |
| | | | | 92/98 R |
| 8,539,984 | B2 | 9/2013 | Baltes | |
| 2004/0045615 | A1 * | 3/2004 | Rupp | F15B 1/106 |
| | | | | 138/30 |
| 2005/0139277 | A1 * | 6/2005 | Baltes | F16L 55/053 |
| | | | | 138/30 |
| 2014/0000740 | A1 * | 1/2014 | Wald | F16L 55/053 |
| | | | | 138/30 |

FOREIGN PATENT DOCUMENTS

| | | |
|---|---|---|
| EP | 1 602 820 A2 | 12/2005 |
| FR | 2 721 354 A1 | 12/1995 |
| NL | 1 016 384 C2 | 4/2002 |
| WO | 03/085270 A2 | 10/2003 |

OTHER PUBLICATIONS

International Preliminary Report on Patentability from International Application No. PCT/IB2017/056561, completed Jan. 31, 2019.

* cited by examiner

US 10,876,506 B2

DAMPER FOR A FLUID LINE, IN PARTICULAR A FUEL LINE FOR AN INTERNAL COMBUSTION ENGINE

This application is a National Stage Application of PCT/IB2017/056561, filed 23 Oct. 2017, which claims benefit of Serial No. 102016000108035, filed 26 Oct. 2016 in Italy and which applications are incorporated herein by reference. To the extent appropriate, a claim of priority is made to each of the above-disclosed applications.

TECHNICAL FIELD

The present invention relates to a damper for a fluid line, in particular a fuel line for an internal combustion engine. The damper serves to damp the pulsating fluid flow in the fluid line, reducing the pressure fluctuations of the fluid.

BACKGROUND ART

A damper serves to damp the pulsating fluid flow in the fluid line, reducing the pressure fluctuations of the fluid. This allows to reduce the noise created by the flow of the fluid in the line. Such dampers are conveniently used in the fuel lines for internal combustion engines.

U.S. Pat. No. 4,729,360 describes a particular type of these dampers, having a membrane separating, in a fluid tight manner, a resonance chamber from a fluid chamber in which the fluid flows. The membrane, by vibrating in response to the fluid flow, reduces the peak of pressure fluctuation of the fluid, in order to also reduce the noise generated by the fluid. This aspect is advantageous in a fuel line for an internal combustion engine such as motor vehicle.

However, such devices suffer from few drawbacks.

One drawback is that the dampers known in the art have a complex construction.

A further drawback is that the membrane is pressed between two parts for keeping the membrane in position and for ensuring the watertight seal. Therefore, the damper suffers from a reduced reliability, since the membrane could undesirably slip away from the parts.

DE 102013220807 A1 relates to a pump unit for a high-pressure pump with a pump housing and a low-pressure damper. In the pump housing, a low pressure supply and a working space are formed. The working space can be hydraulically coupled via an inlet valve to the low-pressure feed line. The low-pressure damper has a fluid-tight pressure compensation chamber which is delimited by an elastically deformable diaphragm and by a damper housing. Inside the pressure compensation chamber is a spring element with the diaphragm and the damper housing in operative connection. The low-pressure damper is arranged such that it is hydraulically coupled to the low-pressure feed line on a side of the membrane facing away from the pressure compensation chamber. It further relates to a low-pressure damper for use in a pump unit.

WO 03/085270 A2 relates to a hydraulic accumulator, preferably a membrane accumulator, in particular for damping pulsations in fluid circuits, comprising an accumulator housing, with at least one inlet and an outlet for the fluid for damping, whereby a separating element, preferably in the form of a membrane, separates a gas reservoir from a fluid chamber within the accumulator housing. A hydraulic accumulator with high working capacity of high reliability which little space requirement despite high accumulation capacity for the working gas in the gas reservoir can be achieved, whereby an embodiment has a support device within the accumulator housing, running within the gas reservoir or defining the same, forming a possible support for the separating element and the gas reservoir of the accumulator housing is sufficiently large in dimension that the total necessary gas volume is retained within the accumulator housing itself and/or alternatively the membrane is formed from an elastic material, in particular a rubber material and comprises polytetrafluoroethylene or compounds thereof as a gas barrier layer.

EP 1602820 A2 discloses a pulsation absorber provided in a fluid channel formed in a body of a fluid coupling. Fluid flows through the fluid channel in an assembled state. The pulsation absorber is arranged to deform in a same direction as the fluid to flow in the fluid channel pulsates. The pulsation absorber thereby absorbs pulsation of the fluid.

SUMMARY OF THE INVENTION

It is one object of the present invention to provide a damper for a fluid line, which in particular can solve these and other problems of the prior art while being simple and economical to manufacture.

A further object is to provide a damper for a fluid line which is reliable.

According to the present invention, at least some of these and other objects are achieved through a damper for a fluid line, in particular a fuel line for an internal combustion engine, comprising:

a housing having at least an inlet and an outlet for a fluid, a membrane located in the housing and intended to be in contact with the fluid flowing from the inlet to the outlet, a damping chamber defined by the housing and the membrane, a fluid chamber, separated from the damping chamber by the membrane, in fluidic communication with the inlet and the outlet;

characterized in that a peripheral edge of the membrane comprises an enlarged and/or thickened portion which includes at least two opposite protrusions that are inserted respectively into two grooves of the housing, for constraining the membrane to the housing.

According to the invention, the membrane comprises an enlarged and/or thickened portion, i.e. a portion that is oversized compared to the rest of the membrane.

The invention guarantees holding of the membrane in an operation position. This is allowed by means which protrude from two opposite surfaces or faces of the membrane and are suitable to cooperate by abutment with groove walls so as to ensure the above mentioned holding.

It is to be understood that the appended claims are an integral part of the technical teachings provided in the following detailed description of the invention.

These optional features are:

the housing comprises an upper half-body and a lower half-body between which the membrane is interposed, and wherein the grooves are defined respectively by said half-bodies;

the housing comprises at least two constraint portions located in a radially internal position to the enlarged and/or thickened portion, for preventing movements of the protrusions towards a radially internal zone of the membrane;

the damping chamber is or intended to be filled with a liquid or a foam;

the half-bodies and the membrane are made of a material comprising plastic material;

the upper half-body has an upper constraint portion, and the lower half-body has a lower constraint portion;

the upper constraint portion is an upper constraint rim, and the lower constraint portion is a lower constraint rim;

the protrusions are an upper protrusion and a lower protrusion;

wherein the damping chamber is sealed;

the half-bodies are made of a composite material having glass fiber as reinforcement;

the upper half-body comprises glass fiber and organic filler, and the lower half-body comprises glass fiber and carbon black as filler;

the upper half-body and the lower half-body are welded together;

the peripheral edge is an outer peripheral edge of the membrane;

the protrusions have an annular shape extending about a revolution axis of the membrane;

the membrane is free to vibrate without any abutment part located within the damping chamber.

The present invention further concerns a process for manufacturing a damper as described above, comprising the following steps:

manufacturing the half-bodies, placing the membrane onto the lower half-body, placing the upper half-body on the lower half-body enclosing the protrusions into the grooves, welding the half-bodies.

BRIEF DESCRIPTION OF THE DRAWINGS

Further features and advantages of the present invention will become apparent from the following detailed description, which is supplied by way of non-limiting example with particular reference to the annexed drawings, wherein.

DETAILED DESCRIPTION OF THE INVENTION

Figure 1:
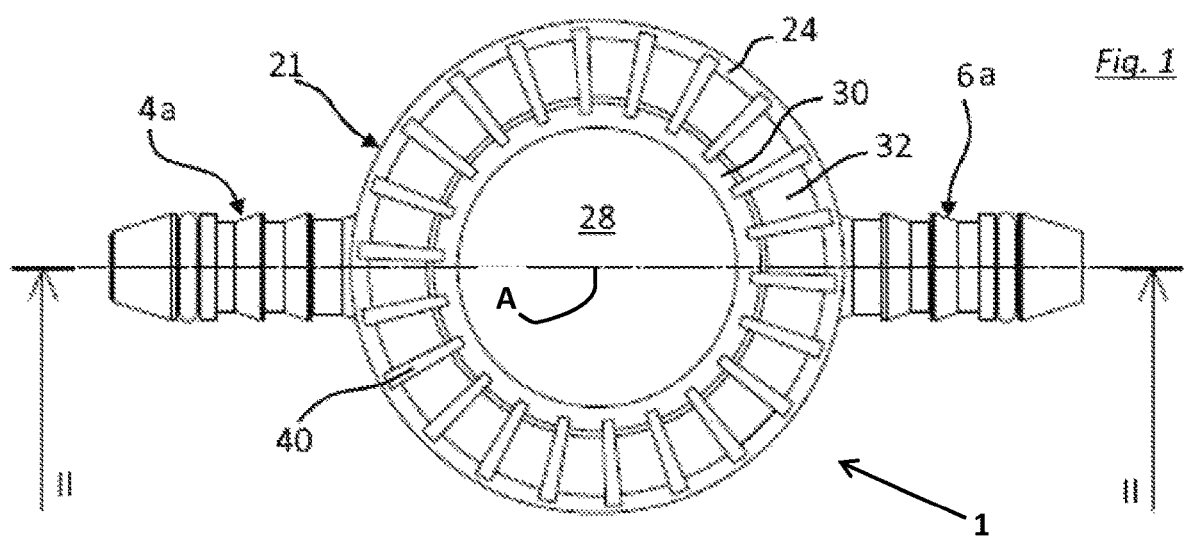
FIG. 1 is a plan view according to one embodiment of a damper according to the present invention.

With particular reference to the drawings, the invention concerns a damper 1 for a fluid line, in particular a fuel line for an internal combustion engine, comprising:

a housing 2 having an inlet 4 and an outlet 6 for a fluid, a membrane 8 located in the housing 2 and intended to be in contact with the fluid flowing from the inlet 4 to the outlet 6, a damping chamber 10 defined by the housing 2 and the membrane 8, a fluid chamber 12, separated from the damping chamber 10 by the membrane 8, in fluidic communication with the inlet 4 and the outlet 6;

wherein radial peripheral edge of the membrane 8 comprises an enlarged and/or thickened portion 14 that is inserted into a recess 16 of the housing 2, for constraining the membrane 8 to the housing 2. More precisely, the portion 14 includes at least two opposite protrusions 14a, 14b that are inserted respectively into two grooves 6a, 6b of the housing.

Figure 2:
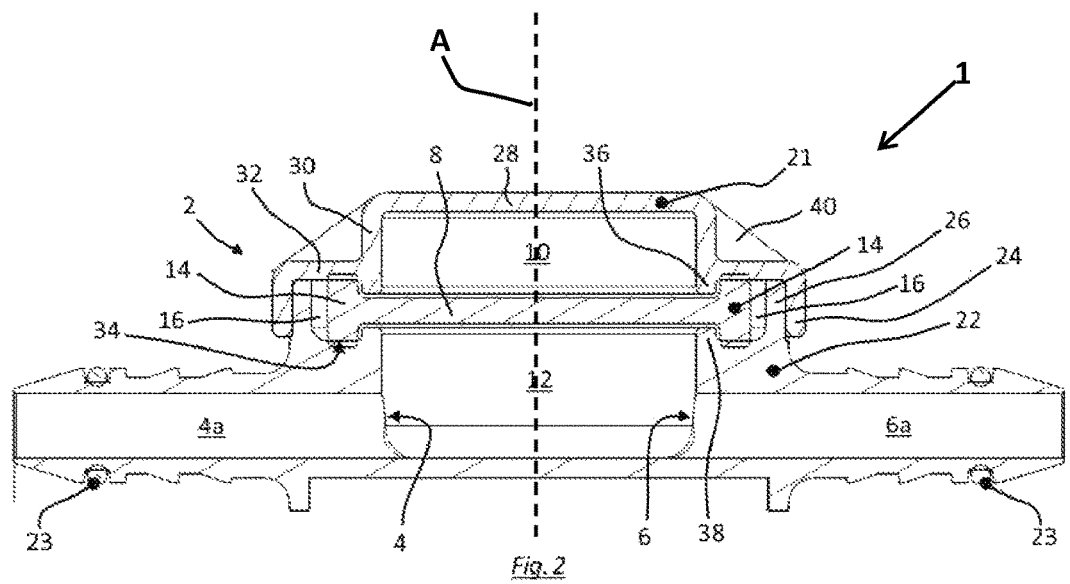
FIG. 2 is a section view of the damper of FIG. 1 along the line II-II.

FIGS. 1 and 2 illustrates a first embodiment of the invention. Reference A designates an axis of the damper. This axis A is substantially perpendicular to the membrane 8 which is substantially planar when it is not subjected to deformation or vibration. In case where the membrane 8 would be substantially circular in shape, axis A could pass through a central point of the membrane 8 and can be considered as a revolution axis of the membrane. Similarly, in case where the housing would have a substantially cylindrical external shape, axis A could be considered as a revolution axis of the housing.

The damper can conveniently be employed in a fuel feed or return line for an internal combustion engine, in particular for a motor vehicle such as a car. The fuel line is preferably a gasoline or diesel fuel line configured for cooperating with a gasoline or diesel engine respectively. The fluid line is conveniently connected to a fluid pressure system. In particular, the fuel line is part of a fuel injection system. The damper can also be conveniently employed in a cooling circuit for an engine, such as an internal combustion engine, in particular for a motor vehicle; for example, the damper can be applied in a feed or return duct for a coolant fluid or liquid.

The membrane 8 separates the damping chamber 10 from the fluid chamber 12 in a fluid tight manner. Preferably, the damping chamber 10 is sealed. The membrane 8 seals the damping chamber 10 in a fluid tight manner. The damping chamber 10 does not communicate with the outside. Alternatively, the damping chamber 10 communicates with the outside, for example through an opening in the housing 2 (e.g. in an upper half body 21).

Any radial movements relative to the axis A of the membrane 8 are conveniently prevented thanks to the engagement of the enlarged portion 14 into the recess 16.

The fluid enters from the inlet 4 into the fluid chamber 12, and then exits from the outlet 6. Due to the passage of the fluid, the membrane 8 vibrates so as to reduce the pressure fluctuations of the fluid, thus dampening the noise generated by the fluid flow.

In the preferred example shown, the thickness of the membrane 8 within the enlarged portion 14 (i.e., in a radially internal zone with respect to the enlarged portion 14) is substantially constant. As mentioned above, conveniently, the membrane 8 is circular, and the enlarged portion 14 is a peripheral circle. In particular, the membrane 8 is planar in the undeformed state (i.e. in a rest condition). The chambers 10, 12 illustrated are circular too (in a plane view); in particular, the chambers 10, 12 are substantially cylindrical.

Conveniently, the height of the damping chamber 10 is designed so that, when the pressure of the fluid in the fluid chamber 12 reaches a higher threshold value, the membrane 8 abuts the upper part of the damping chamber 10 (in the figures, a upper wall 28). In this way, the stresses in the membrane 8 are limited, reducing the risk of breakage. Such height is conveniently calculated as a function of the diameter, thickness, material of the membrane 8, maximum design pressure of the fluid in the fluid chamber 12. Preferably, the height of the fluid chamber 12 is designed so that, when the pressure of the fluid in the fluid chamber 12 reaches a lower threshold value (generally, a negative pressure), the membrane 8 does not obstruct the fluid flow between the inlet 4 and the outlet 8. Thus, in the fluid chamber 12 there is always a space allowing the fluid to flow, ensuring the correct functioning of the damper. Such height is conveniently calculated as a function of the diameter, thickness, material of the membrane 8, minimum design pressure of the fluid in the fluid chamber 12. Conveniently, the height of fluid chamber 12 is also designed to achieve the best performance in terms of acoustic dampening.

In particular, the inlet 4 and the outlet 6 are comprised in two ducts (an inlet duct 4a and an outlet duct 6a, respectively) radially disposed with respect to the fluid chamber 12. In particular, the ducts 4a and 6a are straight, preferably aligned on a same plane, and more preferably aligned on a same straight line. In the preferred example, the straight line connecting the axes of the ducts 4a and 6a passes through the fluid chamber 12. Therefore, the damper causes advantageously low load losses in the fluid when in use. According to further embodiments, there can be a plurality of inlets 4 and/or outlets 6. It is also possible to locate the ducts 4a and 6a in a different manner in the space, for example the ducts 4a and 6a might be not radially arranged or not in the same plane.

In the preferred example shown, the housing 2 comprises an upper half-body 21 and a lower half-body 22 among which the membrane 8 is interposed; the recess 16 is defined by or between said half-bodies 21, 22. In particular, the ducts 4a and 6a are integral with the lower half-body 22, and allow to connect the damper with the fluid line. Optionally, sealing means, such as a gasket 23 (for example an O-ring), ensure the watertight sealing between the damper and the pipes of the fluid line.

In the example shown, the ducts 6a, 6b are configured to be engaged into the pipes of the fluid lines and include external annular ribs so as to avoid involuntary dismounting of these parts in operation. Alternatively, at least one of the ducts is configured to be connected to the pipes by snap fitting. The ducts may be of the male-type and the pipes of the female-type, or the opposite.

Optionally, the upper half-body 21 and the lower half-body 22 are mutually mounted in a releasable manner. According to a particular embodiment, the upper half-body 21 and the lower half-body 22 are mutually mounted with a snap mechanism. In this way, it is easy and quick to assemble and disassemble the two half-bodies 21, 22. According to further embodiments, the two half-bodies 21, are mutually mounted with other per se known quick release systems, or by mutual threading.

According to an embodiment, the half-bodies 21, 22 and the membrane 8 are made of a material comprising plastic material, preferably a polymer. The half bodies can be made of plastic material, or of composite material such as fiber reinforced polymers (FRP). Conveniently, the half-bodies 21, 22 comprise a different plastic material than the membrane 8.

Preferably, the half-bodies 21, 22 are made of composite material comprising a plastic matrix (preferably a polymer, such as a thermoplastic polymer), and glass fibre as reinforcement; in particular, they 21, 22 have the same reinforcement, but a different filler. According to a preferred embodiment, the upper half-body 21 comprises glass fiber and organic filler; the lower half-body 22 comprises glass fiber and carbon black as a filler. Preferably, the glass fiber in the upper half-body 21 is 30%-50% w/w, more preferably about 40% w/w. Preferably, the glass fiber in the lower half-body 22 is 40%-60% w/W, more preferably about 50% w/w. The half bodies 21, 22 can be welded together. The membrane 8 is preferably made of plastic material.

For example, suitable materials for the membrane 8 are EPDM, HNBR, FKM. For example, suitable materials for the half-bodies 21, 22 are polyamide, polyphthalamide, PEEK, polyurethane, polyphenilsulphone, ABS, polyacetals.

Preferably, the half-bodies 21, 22 are manufactured by injection moulding. Preferably, the half-bodies 21, 22 are welded together, for instance by ultrasonic welding, laser welding, vibration welding.

Hence, a particular process for manufacturing the damper comprises the steps:
  manufacturing the half-bodies 21, 22,
  placing the membrane 8 onto the lower half-body 22,
  placing the upper half-body 21 on the lower half-body 22 enclosing the enlarged portion 14 in the recess 16,
  welding the half-bodies 21, 22.

In the embodiment shown in the drawings, the upper half-body 21 has a first rim 24 and the lower half-body 22 has a second rim 26, preferably annular and extending about the axis A. In particular, the rims 24, 26 are substantially extending along the axis A and/or vertical in use. Such rims 24, 26 are preferably welded together for joining the half bodies 21, 22. Alternatively, on the rims 24, 26 can be provided quick release systems or threading. As it can be appreciated from the figures, the second rim 26 faces the recess 16. In particular, the rims 24, 26 are disposed radially external to the membrane 8.

With reference to the example shown, the upper half-body 21 has an upper wall 28 and a side wall 30 (in particular, extending along the axis A and/or vertical) facing the damping chamber 10. The first rim 24 is disposed radially external to the side wall 30 and is connected to the side wall 30 by a connecting wall 32 (in particular, transverse relative to the axis A and/or horizontal). The second rim 26 is connected with a horizontal and/or transverse surface 34 of the lower half-body 22. In the example, the recess 16 is defined by the connecting wall 32, the second rim 26, and the surface 34.

The enlarged portion 14 is conveniently compressed in the recess 16. In this way it is possible to ensure the seal between the chambers 10, 12. In the preferred embodiment of FIG. 2, the enlarged portion 14 is vertically and/or axially compressed in the recess 16, in particular by the connecting wall 32 and the horizontal surface 34. Optionally, there is a radial clearance between the recess 16 and the enlarged portion 14, as shown in FIG. 2.

The housing comprises at least a constraint portion located in a radially internal position to the enlarged portion 14, for preventing movements of the enlarged portion 14 towards the radially internal zone of the membrane 8. Preferably, the upper half-body 21 has an upper constraint portion, and the lower half-body 22 has a lower constraint portion. In particular, at least one among the upper and the lower constraint portion is a constraint rim (in particular, an annular rim extending about the axis). In the example, there is an upper constraint rim 36 and a lower constraint rim 38. The upper constraint rim 36 is the lower end of the side wall 30, and the lower constraint rim 38 is the radial internal end of the surface 34. Hence, the constraint rims 36, 38 are in a radially internal part of the recess 16. Optionally, stiffening plates 40 are provided on the housing. These plates can extend radially relative to the axe A (cf. FIG. 1).

In the preferred embodiment shown, the enlarged portion 14 has two transversal protrusions: an upper protrusion and a lower protrusion. The protrusions are preferably annular. The protrusions 14a, 14b have the same shape in the example shown. In other words, the enlarged portion 14 protrudes axially with respect to axis A or transversally with respect to the membrane 8 in two directions (upwardly and downwardly). Hence, the cross-section of the enlarged portion 14 is substantially H-shaped, as shown. In particular, with reference to FIG. 2 wherein the membrane 8 is disposed horizontally/transversely, the enlarged portion 14 is symmetrical with respect to a horizontal/transversal plane of the membrane 8. Moreover, axis A is a symmetrical axis of the membrane 8. The upper protrusion is adapted to lean against the upper constraint rim 36, and the lower protrusion is adapted to lean against the lower constraint rim 38.

Each protrusion 14a, 14b is engaged into a groove 16a, 16b. The grooves 16a, 16b define the recess 16 and are formed in the housing 2. The grooves 16a, 16b are formed respectively in the half-bodies 21, 22. More precisely, the groove 16b is defined by the lower constraint rim 38, the surface 34 and the second rim 26. The groove 16a is defined by the connecting wall 32, the first rim 24 and the second rim 26.

Figure 3:
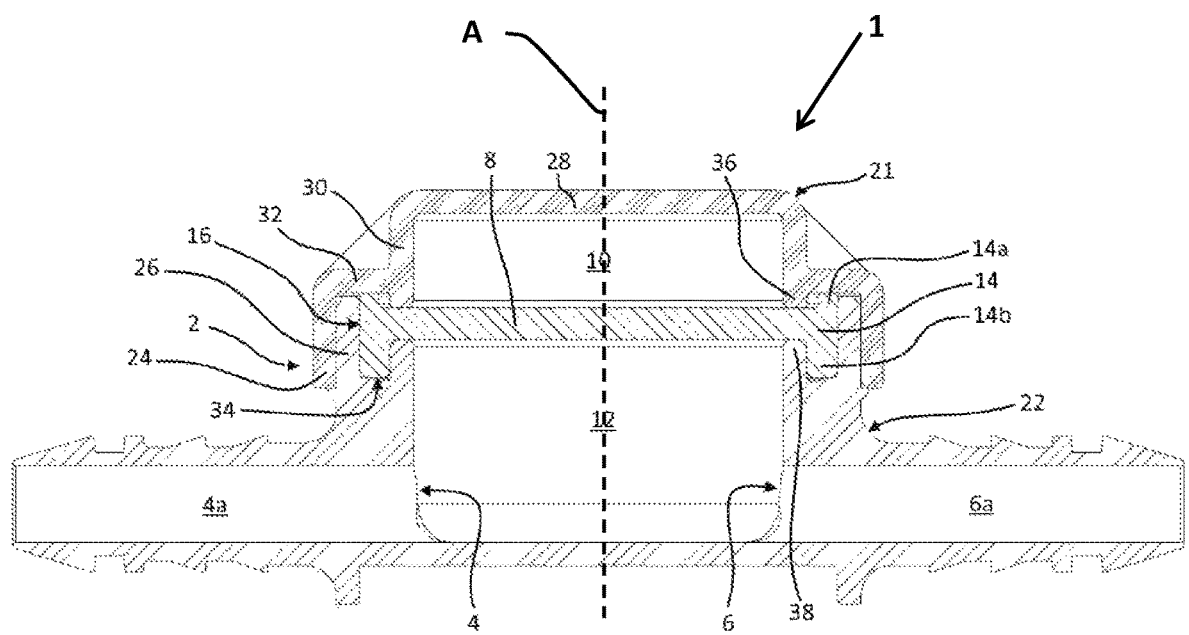
FIG. 3 is a section view of a second embodiment of a damper according to the present invention.

With reference to the second embodiment of FIG. 3, the enlarged portion 14 has two transversal protrusions: an upper protrusion 14a and a lower protrusion 14b, said protrusions 14a, 14b having different shapes. In other words, the enlarged portion 14 protrudes transversally with respect to the membrane 8 in two directions (upwardly and downwardly). The enlarged portion 14 is not symmetrical with respect to a horizontal/transversal plane of the membrane 8. In particular, the upper protrusion 14a is thinner (in a transverse direction with respect to the axis A) and lower in height (i.e. along said axis A or vertically) that the lower protrusion 14b. The upper protrusion 14a faces the upper constraint rim 36, and the lower protrusion 14b is adapted to lean against the lower constraint rim 38. In particular, the lower protrusion 14b is interposed between the lower constraint rim 38 and the second rim 26 without clearance. In particular, the enlarged portion 14 is radially (i.e. horizontally) compressed in the recess 16, in particular by the lower constraint rim 38 and the second rim 26. According to further embodiments, the enlarged portion 14 can be horizontally and/or vertically compressed in the recess 16.

According to a further embodiment of the invention, the enlarged portion 14 has one only transversal protrusion, for example the lower protrusion 14b. Hence, the cross-section of the enlarged portion 14 is substantially U-shaped. In this case there is preferably only one constraint rim, for example the lower constraint rim 38. In case where the enlarged portion 14 would have only the upper protrusion 14a, the cross-section of the enlarged portion 14 would have substantially an inverted U shape.

Preferably, the enlarged portion 14, and in particular the upper protrusion 14a and/or the lower protrusion 14b, is a continuous rib running along the radial peripheral edge of the membrane 8.

Therefore, the membrane 8 is mechanically kept in the correct position within the housing but without causing excessive stress on the membrane 8, since the constraint is realized by mechanical engagement of the enlarged portion and the recess 16. Indeed, in the zone where the membrane 8 bends during its oscillation (i.e. near the rims 36, 38), such membrane 8 is not heavily pressed to avoid that it slips away (as in the prior art). Furthermore, as the enlarged portion 14 is a thicker portion, the stresses due to its compression are reduced. This increases the durability and the reliability of the membrane and consequently of the damper.

Optionally, the damping chamber 10 is filled with a gas, such as air, for example at atmospheric pressure. According to a particular embodiment, the damping chamber 10 is filled with a liquid, or a solid or semi-solid material, such as a foam, preferably a polymeric foam. The liquid or the solid material increases the resistance to vertical deformation of the membrane 8. The fluid in the damping chamber 10 supports the membrane 8 (acting on its upper face) and counteracts the pressure exerted by the fluid in the fluid chamber 12 onto the lower face of the membrane 8. Conveniently, the membrane 8 is designed so as to work, when in use, around its natural resonance frequency. According to an alternative embodiment, in the damping chamber 10 it is arranged a spring acting on the membrane 8.

Preferably, the natural resonance frequency of the membrane 8 is from 20 to 500 Hz, and preferably between about 400-500 Hz. By way of example, the natural resonance frequency of a circular membrane 8 is obtained by the following formula:

$$f_r = \frac{1}{2\pi}\sqrt{\frac{K}{M}}$$

$$K \simeq \frac{\lambda^2 h^3 E}{12S(1-\upsilon^2)}$$

$$M \simeq \rho S h + \frac{4}{3}\rho_F r^3$$

wherein:
E, $\upsilon$=the elasto-dynamic Young modulus and Poisson ratio of membrane 8,
$\rho$=density of membrane 8,
h, S, r=thickness, surface and radius of the membrane 8,
$\rho_F$=density of the fluid intended to flow through the fluid chamber 12.

Hence, in order to design the membrane 8, it is possible to obtain the dimensions of the membrane 8 starting from a given material thereof and from a desired frequency, and vice versa.

Of course, without prejudice to the principle of the invention, the forms of embodiment and the implementation details may be extensively varied from those described and illustrated herein by way of non-limiting example, without however departing from the scope of the invention.

The invention claimed is:

1. A damper for a fuel line for an internal combustion engine, comprising:
 a housing having at least an inlet and an outlet for a fluid;
 a membrane located in the housing and configured to be in contact with the fluid flowing from the inlet to the outlet;
 a damping chamber defined by the housing and the membrane;
 a fluid chamber, separated from the damping chamber by the membrane, in fluidic communication with the inlet and the outlet;
 wherein a peripheral edge of the membrane comprises an enlarged and/or thickened portion which includes at least two opposite protrusions that are inserted respectively into two grooves of the housing, for constraining the membrane to the housing;
 wherein the housing comprises an upper half-body and a lower half-body between which the membrane is interposed, and wherein the grooves are defined respectively by said half-bodies;
 wherein the upper half-body has a first rim, and the lower half-body has a second rim, the first rim and the second rim being annular and extending along an axis substantially perpendicular to the membrane which is substantially planar when the membrane is not subjected to deformation or vibration; wherein the first and second rim are welded together;
 wherein the upper half-body has an upper wall and a side wall facing the damping chamber, and the first rim is disposed radially external to the side wall and is connected to the side wall by a connecting wall; the second rim is connected with a horizontal and/or transverse surface of the lower half-body; wherein the recess is defined by the connecting wall, the second rim, and the surface; and wherein the damping chamber is filled with air at atmospheric pressure; wherein the height of the damping chamber is configured so that, when the pressure of the fluid in the fluid chamber reaches a higher threshold value, the membrane abuts an upper part of the damping chamber, and the membrane is free to vibrate without any abutment part located within the damping chamber.

2. A damper for a fuel line for an internal combustion engine, comprising:
- a housing having at least an inlet and an outlet for a fluid;
- a membrane located in the housing and configured to be in contact with the fluid flowing from the inlet to the outlet;
- a damping chamber defined by the housing and the membrane;
- a fluid chamber, separated from the damping chamber by the membrane, in fluidic communication with the inlet and the outlet;
- wherein a peripheral edge of the membrane comprises an enlarged and/or thickened portion comprising at least two opposite protrusions that are inserted respectively into two grooves of the housing, for constraining the membrane to the housing;
- wherein the housing comprises an upper half-body and a lower half-body between which the membrane is interposed, and wherein the grooves are defined respectively by said half-bodies;
- wherein the upper half-body has a first rim, and the lower half-body has a second rim, the first rim and the second rim being annular and extending along an axis substantially perpendicular to the membrane which is substantially planar when the membrane is not subjected to deformation or vibration; wherein the first and second rim are welded together;
- wherein the upper half-body has an upper wall and a side wall facing the damping chamber, and the first rim is disposed radially external to the side wall and is connected to the side wall by a connecting wall; the second rim is connected with a horizontal and/or transverse surface of the lower half-body; wherein the recess is defined by the connecting wall, the second rim, and the surface; and
- wherein the membrane is circular and is made of polymeric material; a natural resonance frequency of the membrane is between about 20-500 Hz, and the membrane fulfils the following formula:

$$f_r = \frac{1}{2\pi}\sqrt{\frac{K}{M}}$$

$$K \simeq \frac{\lambda^2 h^3 E}{12S(1-v^2)}$$

$$M \simeq \rho S h + \frac{4}{3}\rho_F r^3$$

wherein:
$f_r$ is the natural resonance frequency of the membrane;
E, υ are respectively the elasto-dynamic Young modulus and Poisson ratio of the membrane;
ρ is the density of the membrane;
h, S, r are respectively thickness, surface and radius of the membrane;
$\rho_F$ is the density of the fluid flowing through the fluid chamber, said fluid being fuel for internal combustion engines.

3. The damper according to claim 1, wherein the housing comprises two constraint portions located in a radially internal position to the enlarged and/or thickened portion, for preventing movements of the protrusions towards a radially internal zone of the membrane.

4. The damper according to claim 1, wherein the half-bodies and the membrane are made of a material comprising plastic material.

5. The damper according to claim 3, wherein the upper half-body has an upper constraint portion, and the lower half-body has a lower constraint portion.

6. The damper according to claim 5, wherein the upper constraint portion is an upper constraint rim, and the lower constraint portion is a lower constraint rim.

7. The damper according to claim 1, wherein the protrusions are an upper protrusion and a lower protrusion.

8. The damper according to claim 1, wherein the damping chamber is sealed.

9. The damper according to claim 4, wherein the half-bodies are made of a composite material having glass fiber as reinforcement.

10. A damper for a fuel line for an internal combustion engine, comprising:
- a housing having at least an inlet and an outlet for a fluid;
- a membrane located in the housing and configured to be in contact with the fluid flowing from the inlet to the outlet;
- a damping chamber defined by the housing and the membrane;
- a fluid chamber, separated from the damping chamber by the membrane, in fluidic communication with the inlet and the outlet;
- wherein a peripheral edge of the membrane comprises an enlarged and/or thickened portion comprising at least two opposite protrusions that are inserted respectively into two grooves of the housing, for constraining the membrane to the housing;
- wherein the housing comprises an upper half-body and a lower half-body between which the membrane is interposed, and wherein the grooves are defined respectively by said half-bodies;
- wherein the upper half-body has a first rim, and the lower half-body has a second rim, the first rim and the second rim being annular and extending along an axis substantially perpendicular to the membrane which is substantially planar when the membrane is not subjected to deformation or vibration; wherein the first and second rim are welded together;
- wherein the upper half-body has an upper wall and a side wall facing the damping chamber, and the first rim is disposed radially external to the side wall and is connected to the side wall by a connecting wall; the second rim is connected with a horizontal and/or transverse surface of the lower half-body; wherein the recess is defined by the connecting wall, the second rim, and the surface;
- wherein the half-bodies and the membrane are made of a material comprising plastic material and the half-bodies are made of a composite material having glass fiber as reinforcement; and wherein the upper half-body comprises glass fiber and organic filler, and the lower half-body comprises glass fiber and carbon black as filler.

11. The damper according to claim 1, wherein the peripheral edge is an outer peripheral edge of the membrane.

12. The damper according to claim 1, wherein the protrusions have each an annular shape extending about a revolution axis of the membrane.

13. A fuel line for an internal combustion engine comprising a damper according to claim 1.

14. An internal combustion engine comprising a fuel line according to claim 13.

15. A process for manufacturing a damper according to claim 1, comprising the following steps:
- manufacturing the half-bodies,
- placing the membrane onto the lower half-body,
- placing the upper half-body on the lower half-body enclosing the protrusions in the grooves, and
- welding the first rim and the second rim.

* * * * *